United States Patent
Radcliffe et al.

(10) Patent No.: US 12,536,006 B2
(45) Date of Patent: Jan. 27, 2026

(54) LOCATION OPTIMIZATION FOR RUNNING APPLICATION CODE

(71) Applicant: INTERNATIONAL BUSINESS MACHINES CORPORATION, Armonk, NY (US)

(72) Inventors: Rosalind Toy Allen Radcliffe, Durham, NC (US); Amith Singhee, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 190 days.

(21) Appl. No.: 18/454,050

(22) Filed: Aug. 22, 2023

(65) Prior Publication Data

US 2025/0068403 A1 Feb. 27, 2025

(51) Int. Cl.
*G06F 8/41* (2018.01)
*G06F 8/70* (2018.01)

(52) U.S. Cl.
CPC .............. *G06F 8/443* (2013.01); *G06F 8/70* (2013.01)

(58) Field of Classification Search
CPC .................................. G06F 8/443; G06F 8/70
USPC .................................................. 717/140–155
See application file for complete search history.

(56) References Cited

U.S. PATENT DOCUMENTS

| | | | |
|---|---|---|---|
| 6,996,517 B1 * | 2/2006 | Papaefstathiou | G06F 8/51 703/22 |
| 8,874,642 B2 * | 10/2014 | Bhagat | G06F 9/5083 718/100 |
| 8,972,952 B2 * | 3/2015 | Pizlo | G06F 9/45516 717/128 |
| 9,274,758 B1 * | 3/2016 | Qin | H04L 41/0806 |
| 9,658,937 B2 * | 5/2017 | Christodorescu | G06F 11/3466 |
| 9,753,731 B1 * | 9/2017 | Puzovic | G06F 8/4441 |
| 10,855,536 B1 * | 12/2020 | Blackburn | H04L 67/34 |
| 11,366,739 B2 * | 6/2022 | Daniali | G06F 11/3692 |
| 11,907,096 B2 * | 2/2024 | Ye | G06F 11/3433 |
| 12,271,720 B1 * | 4/2025 | Silver | G06N 5/025 |
| 2007/0300215 A1 | 12/2007 | Bardsley | |
| 2022/0124009 A1 * | 4/2022 | Metsch | H04L 67/146 |

(Continued)

OTHER PUBLICATIONS

Junior et al, "Multicriteria Model for Key Performance Indicators Selection Applied in a Transportation Company", IEEE, pp. 1-5 (Year: 2021).*

(Continued)

*Primary Examiner* — Anil Khatri
(74) *Attorney, Agent, or Firm* — CHIP LAW GROUP (57) ABSTRACT

A method and system for location optimization for running application code include a system resource utilization engine collecting mainframe monitoring data. A workload operational key performance indicator (KPI) engine collects the mainframe system monitoring data, application code identifying information, and a workload definition. The system resource utilization engine and the workload operational KPI engine generate a computing workload model for the workload definition. A performance analyzer performs a first analysis of the computing workload model. An overhead analyzer performs a second analysis of the computing workload model. A target venue score engine generates a target venue score for each of one or more target venues using the first analysis and the second analysis.

17 Claims, 7 Drawing Sheets

(56) References Cited

U.S. PATENT DOCUMENTS

2022/0179694 A1    6/2022    Aronovich
2022/0237107 A1*   7/2022    Subbunarayanan ........................
                                                                               G06F 11/3414

OTHER PUBLICATIONS

Han et al, "Indicators Analysis and Artificial Intelligence Models for Innovative Applications in a Closed Loop Platform", ACM, pp. 1-5 (Year: 2024).*
Lee et al, Optimizing ML with Run-Time Code Generation* ACM, pp. 1-12 (Year: 1996).*
Cooper et al, "Optimizing for Reduced Code Space using Genetic Algorithms", ACM, pp. 1-9 (Year: 1999).*
Kees et al, "C++ Implementations of Numerical Methods for Solving Differential-Algebraic Equations: Design and Optimization Considerations", ACM, pp. 1-27 (Year: 2000).*
Disclosed Anonymously, "Dynamic Alteration of Modernized Workloads into More Efficient Microservices Through Production Run-time Analysis," IP.com No. IPCOM000263780D, Oct. 3, 2020, 6 pages.
Disclosed Anonymously, "Modernization Advice Based on Existing Application Binary Files and Configuration Analysis," IP.com No. IPCOM00026127AD, Feb. 17, 2020, 3 pages.

* cited by examiner

LOCATION OPTIMIZATION FOR RUNNING APPLICATION CODE

BACKGROUND

Technical Field

The present disclosure generally relates to methods and systems for application modernization, and more particularly, to methods and systems for application modernization using location optimization for running application code.

Description of the Related Art

Application modernization involves the practice of updating outdated software using updated computing resources. Specifically, the updated computing resources can include updated frameworks, languages, and infrastructure platforms used to "host" the outdated software. Functionally, there are five general strategies implemented to modernize an application: refactoring, rehosting, rebuilding, replacing, and rearchitecting. Refactoring involves updating the code of an application for optimization purposes. Rehosting involves moving an application to a new environment and involves little change to the architecture of the application. Rebuilding involves rebuilding the code for an application for scaling purposes (on the cloud). Replacing involves switching to another application if an application is not maintained or is too outdated. Rearchitecting involves the rewriting of code for creating cloud compatibility for the application.

Another salient aspect of application modernization includes the function of workload deployment. When an application is run, the associated code is run on a workload venue offered by an IT environment.

SUMMARY

According to an embodiment of the present disclosure, a method for running application code in an optimized location is provided. A system resource utilization engine, a workload operational key performance indicator (KPI) engine, a performance analyzer, an overhead analyzer, and a target venue score engine are utilized to carry out the method. The method includes collecting, by the system resource utilization engine, mainframe system monitoring data. The workload operational KPI engine then collects the mainframe system monitoring data, application code identifying information, and a workload definition. Once the system resource utilization engine and the workload operational KPI engine collect the mainframe system monitoring data, the application code identifying information, and the workload definition, the system resource utilization engine and the workload operational KPI engine generate a computing workload model for the workload definition. The performance analyzer then performs a first analysis of the computing workload model. The overhead analyzer then performs a second analysis of the computing workload model. The target venue score engine then generates a target venue score for each of one or more target venues using the first analysis and the second analysis. The method is advantageous in that the optimized allocation of workloads leads to the saving of computational resources.

In one embodiment, which can be combined with the previous embodiment, one of the one or more target venues includes a current venue running the application code.

In another embodiment, which can be combined with the previous embodiments, each of the one or more target venues includes: a middleware runtime, a container platform, a PaaS (platform as a service) on a private cloud, or a PaaS on a public cloud.

In another embodiment, which can be combined with the previous embodiments, the method further includes transferring, based on the generation of the target venue score for each of the one or more target venues, the application code to one of the one or more target venues. The transferring is advantageous in that the transferring allows modernization of the application architecture to additional target venues and also realigns the application deployment to updated enterprise preferences of target venues based on business priorities.

In another embodiment, which can be combined with the previous embodiments, the first analysis includes applying the computing workload model to one or more performance impact models and comparing the one or more applied performance impact models when the one or more applied performance impact models are applied to one or more target venue resource models.

In another embodiment, which can be combined with the previous embodiments, the second analysis includes applying the computing workload model to one or more overhead impact models and comparing the one or more overhead impact models when the one or more overhead impact models are applied to one or more target venue resource models.

In another embodiment, which can be combined with the previous embodiments, the target venue scores are calculated using at least one or more factors comprising: performance impact, performance hotspots, overhead impact, overhead hotspots, security posture, compliance posture, availability, or disaster recovery.

According to an embodiment of the present disclosure, a computer program product for running application code in an optimized location is provided. The computer program product includes a computer readable storage medium embodying program instructions executable by a processor to cause the processor to perform a plurality of steps. A system resource utilization engine collects mainframe system monitoring data. A workload operational KPI engine then collects the mainframe system monitoring data, application code identifying information, and a workload definition. Once the system resource utilization engine and the workload operational KPI engine collect the mainframe system monitoring data, the application code identifying information, and the workload definition, the system resource utilization engine and the workload operational KPI engine generate a computing workload model for the workload definition. A performance analyzer then performs a first analysis of the computing workload model. An overhead analyzer then performs a second analysis of the computing workload model. A target venue score engine then generates a target venue score for each of one or more target venues using the first analysis and the second analysis. The computer program product is advantageous in that the optimized allocation of workloads leads to the saving of computational resources.

In one embodiment, which can be combined with the previous embodiment, one of the one or more target venues includes a current venue running the application code.

In another embodiment, which can be combined with the previous embodiments, each of the one or more target venues includes: a middleware runtime, a container platform, a PaaS (platform as a service) on a private cloud, or a PaaS on a public cloud.

In another embodiment, which can be combined with the previous embodiments, the computer program product further includes transferring, based on the generation of the target venue score for each of the one or more target venues, the application code to one of the one or more target venues. The transferring is advantageous in that the transferring allows modernization of the application architecture to additional target venues and also realigns the application deployment to updated enterprise preferences of target venues based on business priorities.

In another embodiment, which can be combined with the previous embodiments, the first analysis includes applying the computing workload model to one or more performance impact models and comparing the one or more applied performance impact models when the one or more applied performance impact models are applied to one or more target venue resource models.

In another embodiment, which can be combined with the previous embodiments, the second analysis includes applying the computing workload model to one or more overhead impact models and comparing the one or more overhead impact models when the one or more overhead impact models are applied to one or more target venue resource models.

According to an embodiment of the present disclosure, a computing system is provided. There is a processor, a network module coupled to the processor to enable communication over a network, a non-transitory computer-readable storage device coupled to the processor, a system resource utilization engine coupled to the processor, a workload operational KPI engine coupled to the processor, a performance analyzer coupled to the processor, an overhead analyzer coupled to the processor, and a target venue score engine coupled to the processor. Program instructions are stored on the non-transitory computer-readable storage device for execution by the processor via a memory.

According to an embodiment of the present disclosure, a computing system, in conjunction with the program instructions, is configured to perform a method for running application code in an optimized location. The system resource utilization engine collects mainframe system monitoring data. The workload operational KPI engine then collects the mainframe system monitoring data, application code identifying information and a workload definition. Once the system resource utilization engine and the workload operational KPI engine collect the mainframe system monitoring data, the application code identifying information and the workload definition, the system resource utilization engine and the workload operational KPI engine generate a computing workload model for the workload definition. The performance analyzer then performs a first analysis of the computing workload model. The overhead analyzer then performs a second analysis of the computing workload model. The target venue score engine then generates a target venue score for each of one or more target venues using the first analysis and the second analysis. The computing system is advantageous in that the optimized allocation of workloads leads to the saving of computational resources.

In one embodiment, which can be combined with the previous embodiments, one of the one or more target venues includes a current venue running the application code.

In another embodiment, which can be combined with the previous embodiments, each of the one or more target venues includes: a middleware runtime, a container platform, a PaaS (platform as a service) on a private cloud, or a PaaS on a public cloud.

In another embodiment, which can be combined with the previous embodiments, the computing system further includes program instructions for transferring, based on the generation of the target venue score for each of the one or more target venues, the application code to one of the one or more target venues. The program instructions for transferring are advantageous in that the program instructions for transferring allow modernization of the application architecture to additional target venues and also realignment of the application deployment to updated enterprise preferences of target venues based on business priorities.

In another embodiment, which can be combined with the previous embodiments, the first analysis includes applying the computing workload model to one or more performance impact models and comparing the one or more applied performance impact models when the one or more applied performance impact models are applied to one or more target venue resource models.

In another embodiment, which can be combined with the previous embodiments, the second analysis includes applying the computing workload model to one or more overhead impact models and comparing the one or more overhead impact models when the one or more overhead impact models are applied to one or more target venue resource models.

In another embodiment, which can be combined with the previous embodiments, the target venue scores are calculated using at least one or more factors comprising: performance impact, performance hotspots, overhead impact, overhead hotspots, security posture, compliance posture, availability, or disaster recovery.

The techniques described herein may be implemented in a number of ways. Example implementations are provided below with reference to the following figures.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

Overview

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
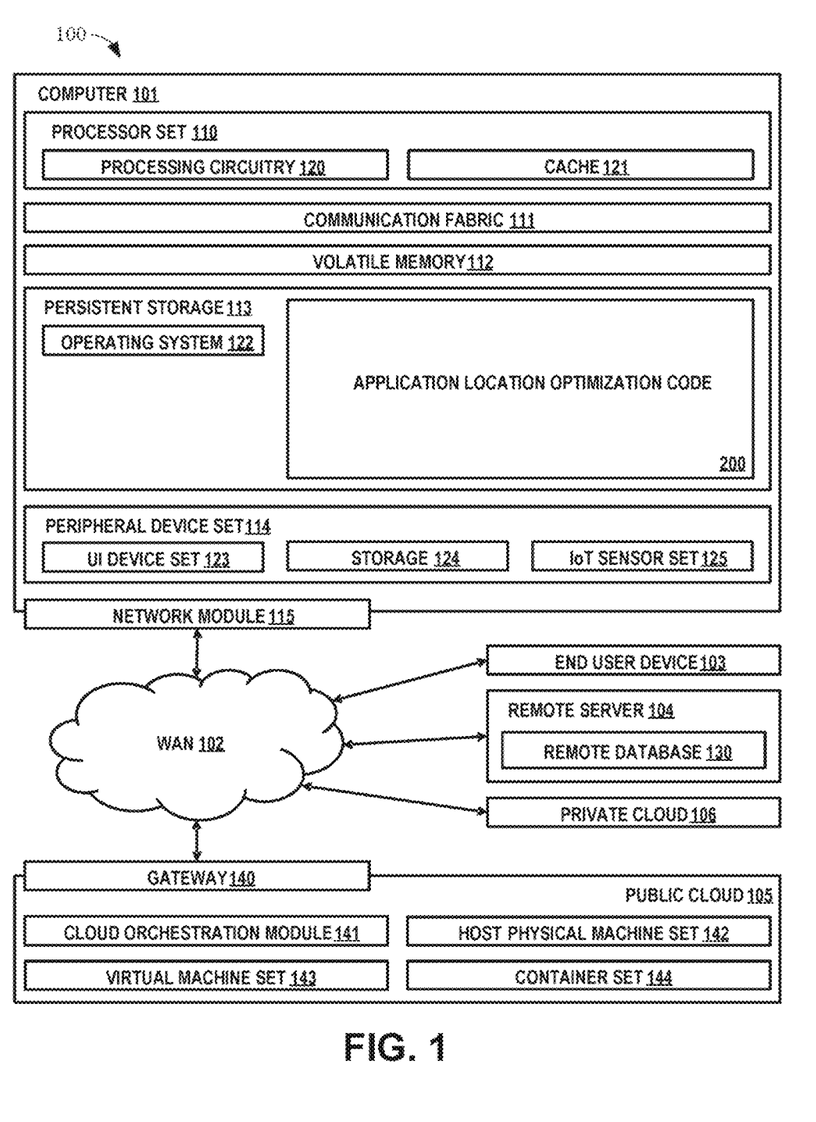
FIG. 1 is a functional block diagram illustration of a computing environment that can communicate with various networked components, consistent with an illustrative embodiment.

FIG. 1 is a functional block diagram illustration of a computing environment 100 that can communicate with various networked components, such as the cloud, a policy data source, etc. In particular, FIG. 1 illustrates a computing environment 100, as may be used to implement a component, such as, for example, a system resource utilization engine 310, a workload operational KPI engine 320, a performance analyzer 340, an overhead analyzer 350, and a target venue score engine 370.

Computing environment 100 includes an example of an environment for the execution of at least some of the computer code involved in performing the inventive methods, such as application location optimization code block 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The present disclosure generally relates to methods for location optimization for running application code. By virtue of the concepts discussed herein, system and data metrics of a workload (running an application) are collected to create a computing workload model used to identify an appropriate target venue for the workload.

Importantly, although the operational/functional descriptions described herein may be understandable by the human mind, they are not abstract ideas of the operations/functions divorced from computational implementation of those operations/functions. Rather, the operations/functions represent a specification for an appropriately configured computing device. As discussed in detail below, the operational/functional language is to be read in its proper technological context, i.e., as concrete specifications for physical implementations.

Accordingly, one or more of the methodologies discussed herein may obviate a need for time consuming data processing by the user. This may have the technical effect of reducing computing resources used by one or more devices within the system. Additionally, one or more of the methodologies discussed herein may obviate a need for inefficient distribution of application code. This may also have the technical effect of reducing computing resources used by one or more devices within the system. Examples of such computing resources include, without limitation, processor cycles, network traffic, memory usage, storage space, and power consumption.

It should be appreciated that aspects of the teachings herein are beyond the capability of a human mind. It should also be appreciated that the various embodiments of the subject disclosure described herein can include information that is impossible to obtain manually by an entity, such as a human user. For example, the type, amount, and/or variety of information included in performing the process discussed herein can be more complex than information that could be reasonably be processed manually by a human user.

Figure 2A:
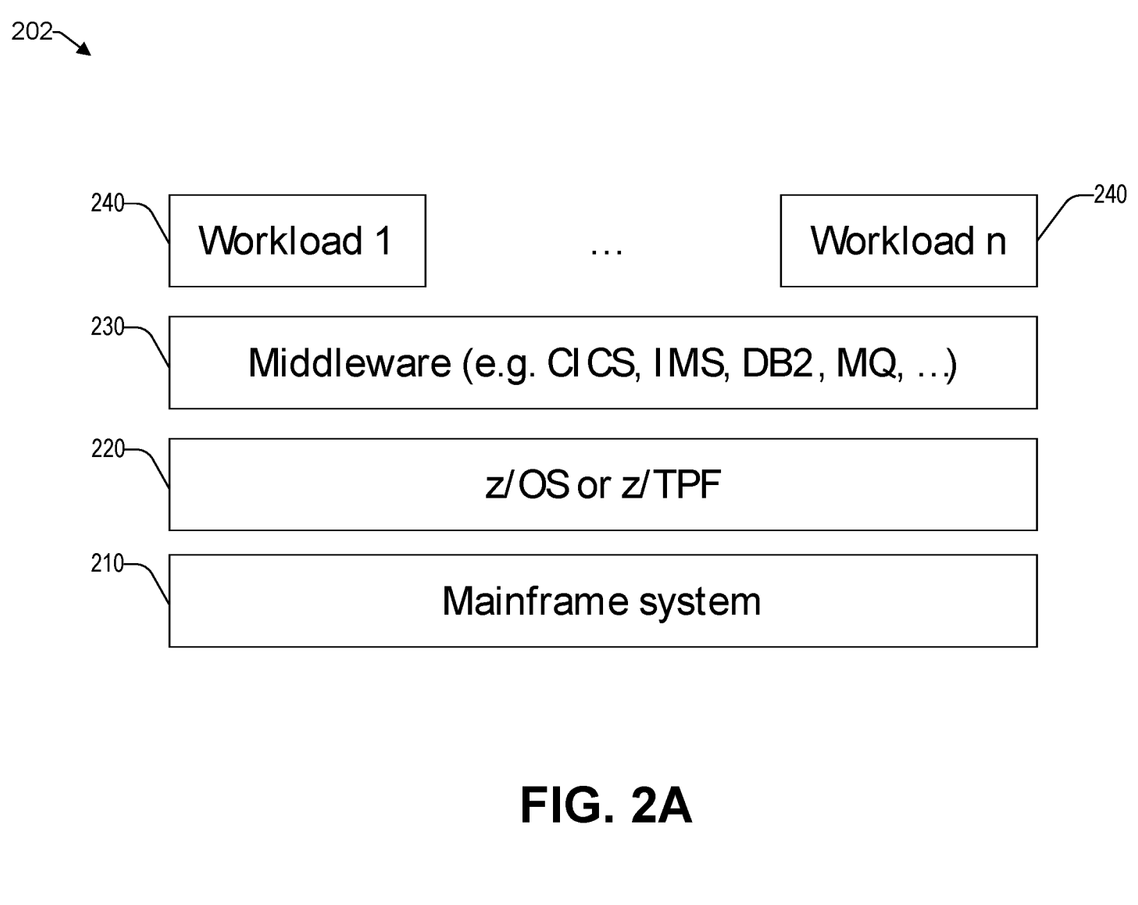
FIG. 2A is a simple diagram showing a conventional workload deployment.

Reference is now made to FIG. 2A, which is a simple diagram 202 showing a conventional workload deployment. As shown, a mainframe system 210 runs an operating system 220 (as shown for example, z/OS® or z/TPF) (z/OS is a registered trademark of the International Business Machines Corporation). Workloads 240 (Workload 1 through Workload n) are run on operating system 220. Middleware 230 [as shown for example, Customer Information Control System (CICS®), Information Management System (IMS®), Database 2 (DB2®), or Message Queue (MQ®)] enables data management and communication between workloads 240 and mainframe system 210 (CICS®, IMS®, DB2®, and MQ® are registered trademarks of the International Business Machines Corporation). In an embodiment, middleware can include any middleware that enables data management and communication between workloads 240 and mainframe system 210.

Figure 2B:
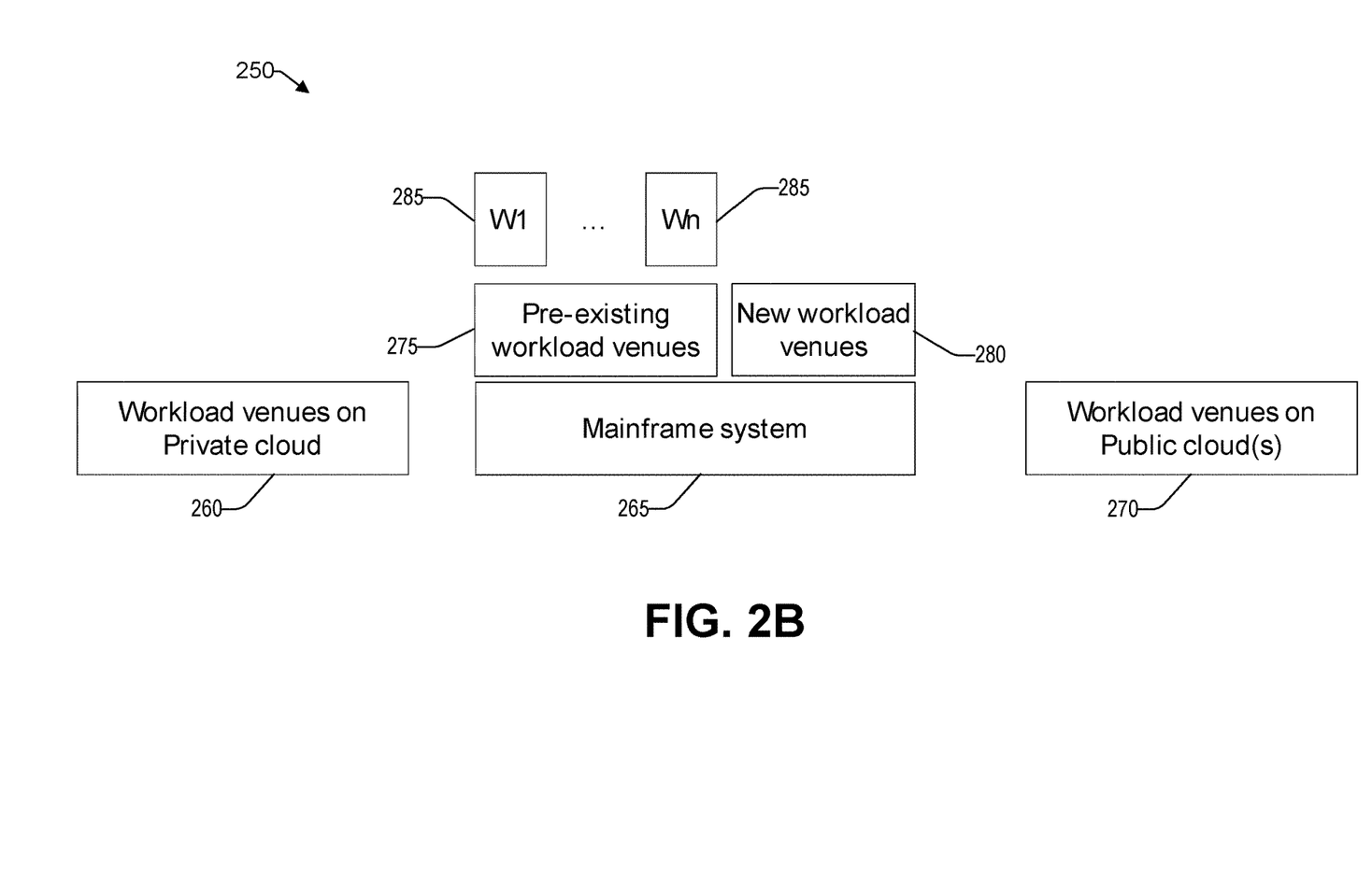
FIG. 2B is a simple diagram showing a workload deployment including multiple venues.

Reference is now made to FIG. 2B, which is a simple diagram 250 showing a workload deployment including multiple venues 260, 270, 275, and 280. As shown, workloads 285 (Workload 1 through Workload n) are run on pre-existing workload venue 275 of mainframe system 265. Based on the configuration of workloads 285 and venues 260, 270, 275, and 280, one or more of the workloads can be moved and run on other venues such as, but not limited to: new workload venues 280 of mainframe system 265, workload venues on private cloud 260, or workload venues on public cloud(s) 270.

In an embodiment, any single workload of workloads 240 and 285 includes an online application, batch applications, or functional components thereof. In a further embodiment, any single workload of workloads 240 and 285 is written in programming language including, but is not limited to: COBOL, PL/I, Assembler, Natural, JCL, or Java® (Java® is a registered trademark of Oracle America, Inc.). In a further embodiment, any single workload of workloads 240 and 285 utilizes runtime middleware such as, but not limited to: CICS®, Information Management System Transaction Manager (IMS TM). In a further embodiment, any single workload of workloads 240 and 285 utilizes data storage technology such as, but not limited to: DB2®, Information Management System Database (IMS DB), Virtual Storage Access Method (VSAM), ADABAS (adaptable database system), or Basic Direct Access Method (BDAM). In a further embodiment, any single workload of workloads 240 and 285 interacts with other middleware/software such as, but not limited to: MQ® or reporting tools.

Example Architecture

Figure 3:
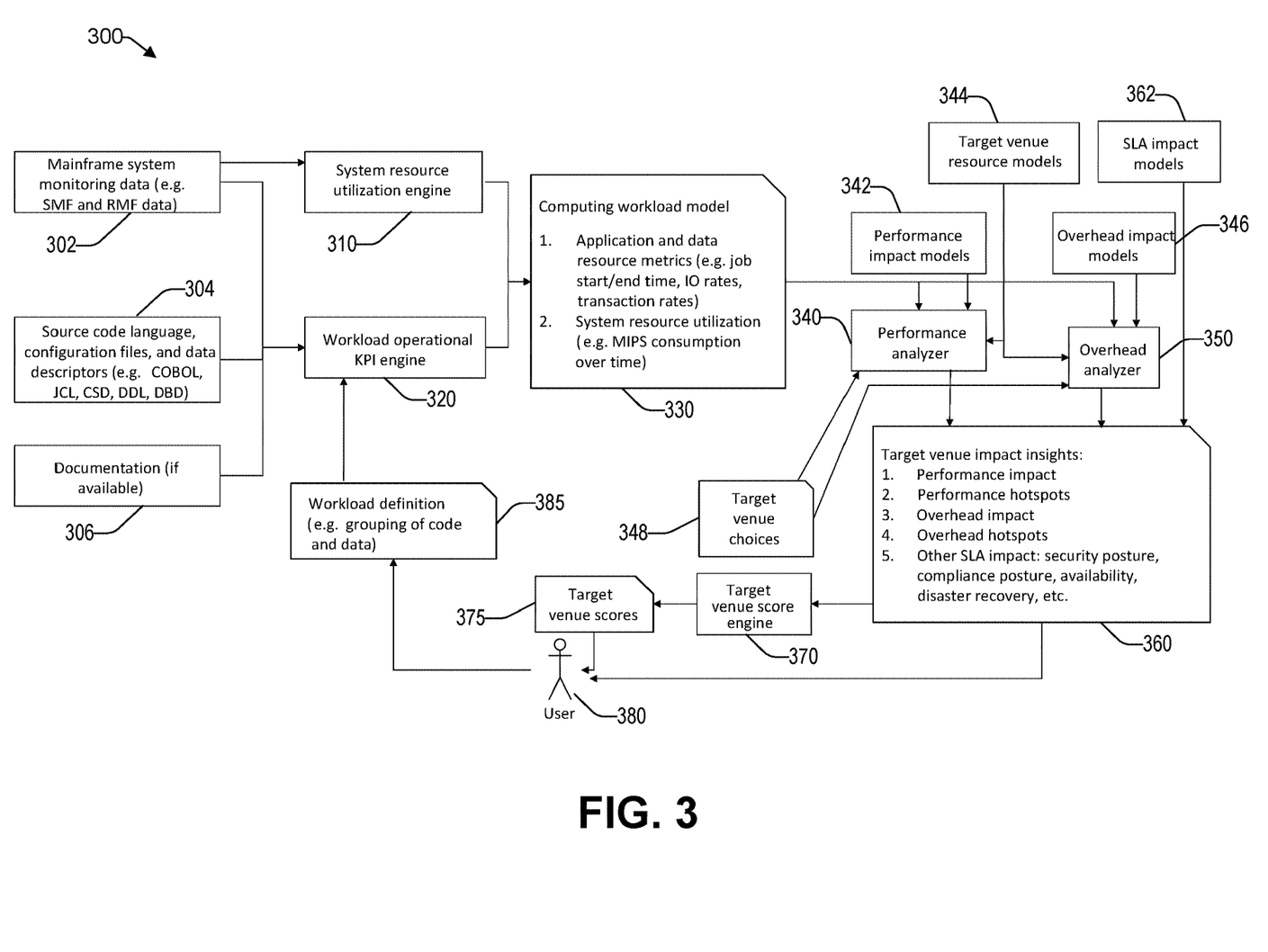
FIG. 3 presents a computing system for running application code in an optimized location, consistent with an illustrative embodiment.

Reference is now made to FIG. 3, which presents a computing system 300 for location optimization for running application code, consistent with an illustrative embodiment. As shown, a network module (similar to the network module 115 of FIG. 1) provides coupling between various components of computing system 300 so that workload information is shared between the components that are configured for location optimization for running application code and include system resource utilization engine 310, workload operational KPI engine 320, performance analyzer 340, overhead analyzer 350, and target venue score engine 370. Network module is coupled to a processor (similar to the processor set 110 of FIG. 1) to enable the processor communication over a network established by network module. Additionally, a non-transitory computer-readable storage device (see FIG. 1) is coupled to the processor.

A graphical user interface/GUI (not depicted) is coupled to the processor to enable communication between computing system 300 and user 380 of computing system 300. GUI is connected, via the network module, to one or more of performance analyzer 340, overhead analyzer 350, and/or target venue score engine 370 to enable user 380 to access information relative to computing workload model 330 and target venues.

System resource utilization engine 310 is coupled to the processor to enable the collection of mainframe system monitoring data 302 by system resource utilization engine 310. In an embodiment, mainframe system monitoring data 302 includes at least one of: system management facility (SMF) data or resource measurement facility (RMF) data.

Workload operational KPI engine 320 is coupled to the processor to enable the collection of mainframe system monitoring data 302, application code identifying information 304, documentation 306, and/or workload definition 385 (for example, a grouping of code and data) in order to compute application and data resource metrics for a workload definition 385 provided to workload operational KPI engine 320. In an embodiment, application code identifying information 304 includes at least one of: source code language, configuration files, or data descriptors. In a further embodiment, the source code language includes at least one of: COBOL or JCL. In a further embodiment, the configuration files include CSD. In a further embodiment, the data descriptors include at least one of: DDL or DBD.

Computing workload model 330 is generated (for the workload definition) from the output of system resource utilization engine 310 and workload operational KPI engine 320. Computing workload model 330 includes application data, resource metrics, and system resource utilization. In an embodiment, application and data resource metrics includes at least one of the following: job start time, job end time, IO rates, or transaction rates. In a further embodiment, application and data resource metrics includes at least one of the following: I/O interaction rates, I/O interaction updates, I/O interaction read ratios, transactions per second at peak, transaction rate overall, average response time per transaction, and system usage per transaction. In a further embodiment, system resource utilization includes, as an example, MIPS consumption over time.

Performance analyzer 340 is coupled to the processor to enable analysis of computing workload model 330 in relation to performance impact models 342, target venue resource models 344, and target venue choices/options 348.

Overhead analyzer 350 is coupled to the processor to enable analysis of computing workload model 330 in relation to overhead impact models 346, target venue resource models 344, and target venue choices/options 348.

Target venue impact insights model 360 is generated from service level agreement (SLA) impact models 362 and the output of performance analyzer 340 and overhead analyzer 350. Model 360 provides information relative to the impact of a target venue on computing workload model 330. In an embodiment, information can include at least one of: performance impact, performance hotspots, overhead impact, overhead hotspots, or other SLA impacts (for example, security posture, compliance posture, availability, disaster recovery, etc.).

Target venue score engine 370 generates, via target venue impact insights model 360, target venue scores file 375 including scores for each target venue in relation to computing workload model 330. Target venue scores file 375 is shared with user 380 to enable user to transfer a workload from a current venue to a new venue (or keep the workload on the current venue).

In an embodiment, workload definition 385 (for example, a grouping of code and data) from user 380 is fed back into workload operational KPI engine 320 for further refinement of computing workload model 330 for the specified workload.

Program instructions (additionally referred to as application location optimization code 200) stored on the non-transitory computer-readable storage device are configured for execution by the processor via a memory (similar to the volatile memory 112 of FIG. 1) coupled to the processor. The instructions are configured to render computing device 300 capable of performing a number of operations in a method for running application code in an optimized location (presented similarly in FIG. 6).

The method includes collecting, by the system resource utilization engine 310, mainframe system monitoring data 302. The workload operational KPI engine 320 then collects the mainframe system monitoring data 302, application code identifying information 304, and a workload definition. Once the system resource utilization engine 310 and the workload operational KPI engine 320 collect the mainframe system monitoring data 302, the application code identifying information 304, and the workload definition, the system resource utilization engine 310 and the workload operational KPI engine 320 generate a computing workload model 330 for the workload definition. The performance analyzer 340 then performs a first analysis of the computing workload model 330. The overhead analyzer 350 then performs a second analysis of the computing workload model 330. The target venue score engine 370 then generates a target venue score 375 for each of one or more target venues using the first analysis and the second analysis. The method is advantageous in that the optimized allocation of workloads leads to the saving of computational resources.

In an embodiment, one of the one or more target venues includes a current venue running the application code. Each of the one or more target venues is a software deployment platform such as, but not limited to: a middleware runtime, a container platform, a PaaS (platform as a service) on a private cloud, or a PaaS on a public cloud. In a further embodiment, each of the one or more target venues includes: z/OS®, z/TPF, Linux® on z/VM®, Linux® on KVM, Red Hat® Openshift® on Linux® on KVM, z/CX on z/OS®, Red Hat® Openshift® on z/OS®, Linux® on Power®, Red Hat® Openshift® on Power®, and/or Openshift® on IBM Cloud® (z/VM, Power, and IBM Cloud are registered trademarks of the International Business Machines Corporation. Linux is a registered trademark of Linus Torvalds. Red Hat and Openshift are registered trademarks of Red Hat, Inc.).

In a further embodiment, computing system 300, in conjunction with the program instructions, is further configured to transfer, based on the generation of the target venue score for each of the one or more target venues, the application code to one of the one or more target venues. The transferring is advantageous in that the transferring allows modernization of the application architecture to additional target venues and also realigns the application deployment to updated enterprise preferences of target venues based on business priorities.

In an embodiment, the first analysis may include applying the computing workload model to one or more performance impact models and comparing the one or more applied performance impact models when the one or more applied performance impact models are applied to one or more target venue resource models. In a further embodiment, the second analysis may include applying the computing workload model to one or more overhead impact models and comparing the one or more overhead impact models when the one or more overhead impact models are applied to one or more target venue resource models.

In a further embodiment, the target venue scores are calculated using at least one or more factors comprising: performance impact, performance hotspots, overhead impact, overhead hotspots, security posture, compliance posture, availability, or disaster recovery.

According to an embodiment of the present disclosure, a computer program product for running application code in an optimized location is provided. The computer program product includes a computer readable storage medium embodying program instructions executable by a processor to cause the processor to perform a plurality of steps. These steps may correlate to any process steps/functions relative to any of FIGS. 4-6. The computer program product, in relation to the location optimization method, is advantageous in that the optimized allocation of workloads leads to the saving of computational resources.

Figure 4:
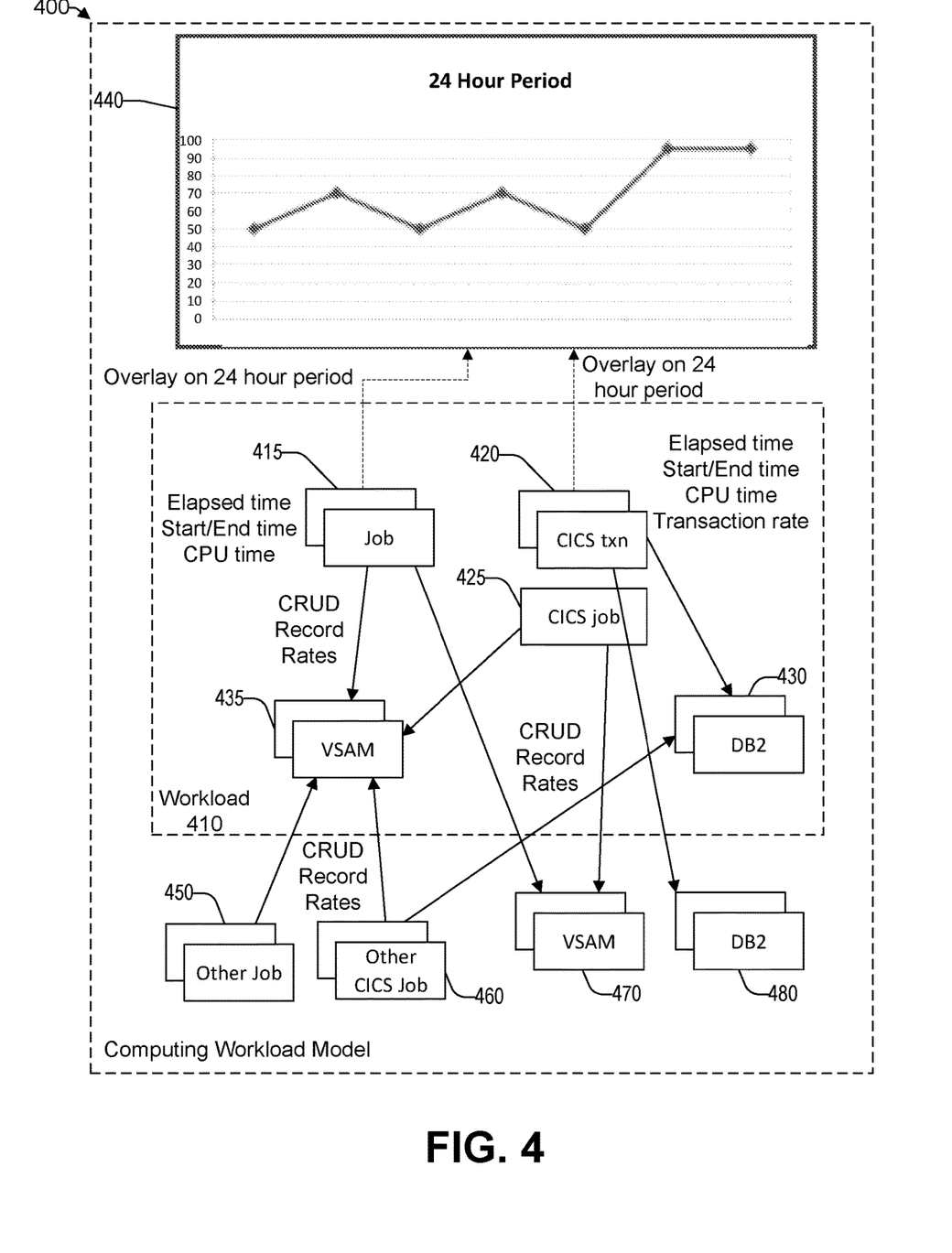
FIG. 4 is a diagram showing an exemplary computing workload model of the computing system shown in FIG. 3, consistent with an illustrative embodiment.

Reference is now made to FIG. 4, which is a diagram showing an exemplary computing workload model 400 of the computing system 300 shown in FIG. 3, consistent with an illustrative embodiment. As shown, workload 410 is calculated using the output from workload operational KPI engine 320 and includes the processing of job and transaction files (in this case, for example, job file 415 and CICS® txn/transaction file 420) in conjunction with associated middleware files such as, for example, CICS® job file 425, DB2® file 430, and VSAM file 435. Other files included in the processing include other job file 450, other CICS® job 460, VSAM file 470 (external to workload 410), and DB2® file (external to workload 410).

It is noted that the Create, Read, Update, and Delete (CRUD) record rates are also included in the calculation of workload 410. In relation to job file 415, application and data resource metrics collected/generated include at least one of, but are not limited to: job elapsed time, job start time, job end time, or job CPU time. In relation to CICS® transaction 420, application and data resource metrics collected/generated include at least one of, but are not limited to: CICS® transaction elapsed time, CICS® transaction start time, CICS® transaction end time, CICS® transaction CPU time, or CICS® transaction rate. Once calculated, workload information is overlaid on a 24-hour period and combined with the output of system resource utilization engine 310 (mainframe system monitoring data 302) to form system resource utilization chart 440.

In an embodiment, workload 410 is configured to interact with multiple vendor products and can include any of PDSFAST or PDSMAN® (PDSMAN® is a registered trademark of CA, Inc.).

Figure 5:
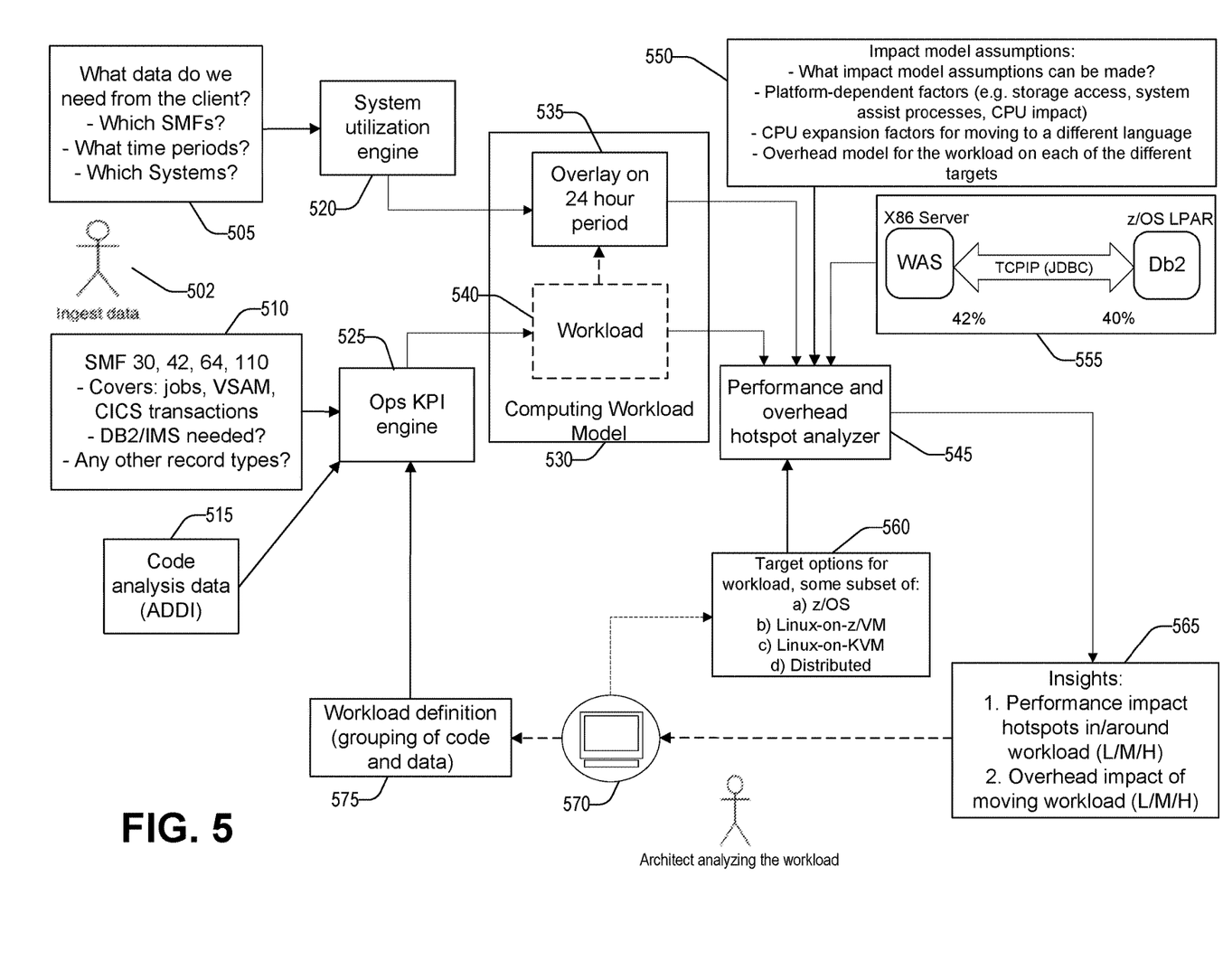
FIG. 5 is a flowchart showing exemplary processes of location optimization for running application code performed in the computing system shown in FIG. 3, consistent with an illustrative embodiment.

Reference is now made to FIG. 5, which is a flowchart 500 showing exemplary processes of location optimization for running application code performed in the computing system 300 shown in FIG. 3, consistent with an illustrative embodiment. For discussion purposes, the flowchart 500 is additionally described with reference to the architecture of environment 100 and computing system 300 of FIGS. 1 and 3.

At block 505, mainframe system monitoring data 302 is identified. As shown, mainframe system monitoring data 302 includes at least one of: client data, SMFs, time periods, or systems. The subject matter of block 505 is configured as ingest data 502, along with blocks 510 and 515, for system utilization engine at block 520 (similar to system resource utilization engine 310) and Ops KPI engine at block 525 (similar to workload operational KPI engine 320).

At block 510, application code identifying information 304 is identified. As shown, application code identifying information 304 includes SMF record type 30, SMF record type 42, SMF record type 64, and SMF record type 110. In addition, application code identifying information 304 is analyzed for record types included within the application code identifying information 304 and can include, in embodiments, any of: job files, VSAM files, CICS® transaction files, DB2® files, and IMS® files.

At block 515, documentation 306 is identified. As shown, documentation 306 includes code analysis data such as, for example, ADDI (IBM® Application Discovery or Delivery Intelligence).

In an embodiment, documentation 306 can include any other source code parsing software besides ADDI.

At block 520, system utilization engine collects mainframe system monitoring data 302.

At block 525, Ops KPI engine collects application code identifying information 304, documentation 306, and/or workload definition at block 575 (similar to workload definition 385 of FIG. 3).

At block 530, a computing workload model (similar to computing workload model 330), is generated for the workload definition. As shown, at block 540, operational KPI data output from Ops KPI engine is generated as a workload, which is subsequently combined with system utilization data output from block 520 (system utilization engine) to form an overlay on a 24-hour period at block 535.

At block 545, a performance and overhead hotspot analyzer (similar to performance analyzer 340 and overhead analyzer 350) receives overlay from block 535, workload from block 540, impact model assumptions information 550, and exemplary impact model from block 555. As shown, impact model assumptions information at block 550 includes platform-dependent factors (for example, storage access, system assist processes, and CPU impact), CPU expansion factors for moving to a different language, and overhead model for the workload on each target venue.

In an embodiment, input data for performance and overhead hotspot analyzer includes peak MIPS (million instructions per second) for each technology component in workload of block 540 (for example, MIPS for CICS®, MIPS for DB2®, etc.).

At block 560, a target venue file is fed to the performance and overhead hotspot analyzer from architect (architect analyzing the workload) at block 570. As shown, target venue file includes a list of target venues such as, but not limited to: z/OS®, Linux® on z/VM®, Linux® on KVM, or distributed.

At block 565, an insights model (similar to target venue impact insights model 360) is generated via performance and overhead hotspot analyzer of block 545. As shown, insight factors include at least one of: performance impact hotspots in/around workload (L/M/H) or overhead impact of moving workload (L/M/H).

At block 570, architect transfers application code to a new venue other than the current venue being utilized by the application code if the insights model favors a different venue. The method is advantageous in that the optimized allocation of workloads leads to the saving of computational resources.

In an embodiment, at block 575, a workload definition (grouping of code and data) is produced and fed into Ops KPI engine at block 525 as an additional factor that can alter the computing workload model at block 530.

In a further embodiment, one of the one or more target venues includes a current venue running the application code.

In a further embodiment, each of the one or more target venues is a software deployment platform such as, but not limited to: a middleware runtime, a container platform, a PaaS (platform as a service) on a private cloud, or a PaaS on a public cloud. In a further embodiment, each of the one or more target venues includes: z/OS®, z/TPF, Linux® on z/VM®, Linux® on KVM, Red Hat® Openshift® on Linux® on KVM, z/CX on z/OS®, Red Hat® Openshift® on z/OS®, Linux® on Power®, Red Hat® Openshift® on Power®, and/or Openshift® on IBM Cloud®.

In a further embodiment, computing system 300, in conjunction with the program instructions, is further configured to transfer, based on the generation of the target venue score for each of the one or more target venues, the application code to one of the one or more target venues. The transferring is advantageous in that the transferring allows modernization of the application architecture to additional target venues and also realigns the application deployment to updated enterprise preferences of target venues based on business priorities.

In a further embodiment, the first analysis includes applying the computing workload model to one or more performance impact models and comparing the one or more applied performance impact models when the one or more applied performance impact models are applied to one or more target venue resource models.

In a further embodiment, the second analysis includes applying the computing workload model to one or more overhead impact models and comparing the one or more overhead impact models when the one or more overhead impact models are applied to one or more target venue resource models.

In a further embodiment, the target venue scores are calculated using at least one or more factors comprising: performance impact, performance hotspots, overhead impact, overhead hotspots, security posture, compliance posture, availability, or disaster recovery.

Figure 6:
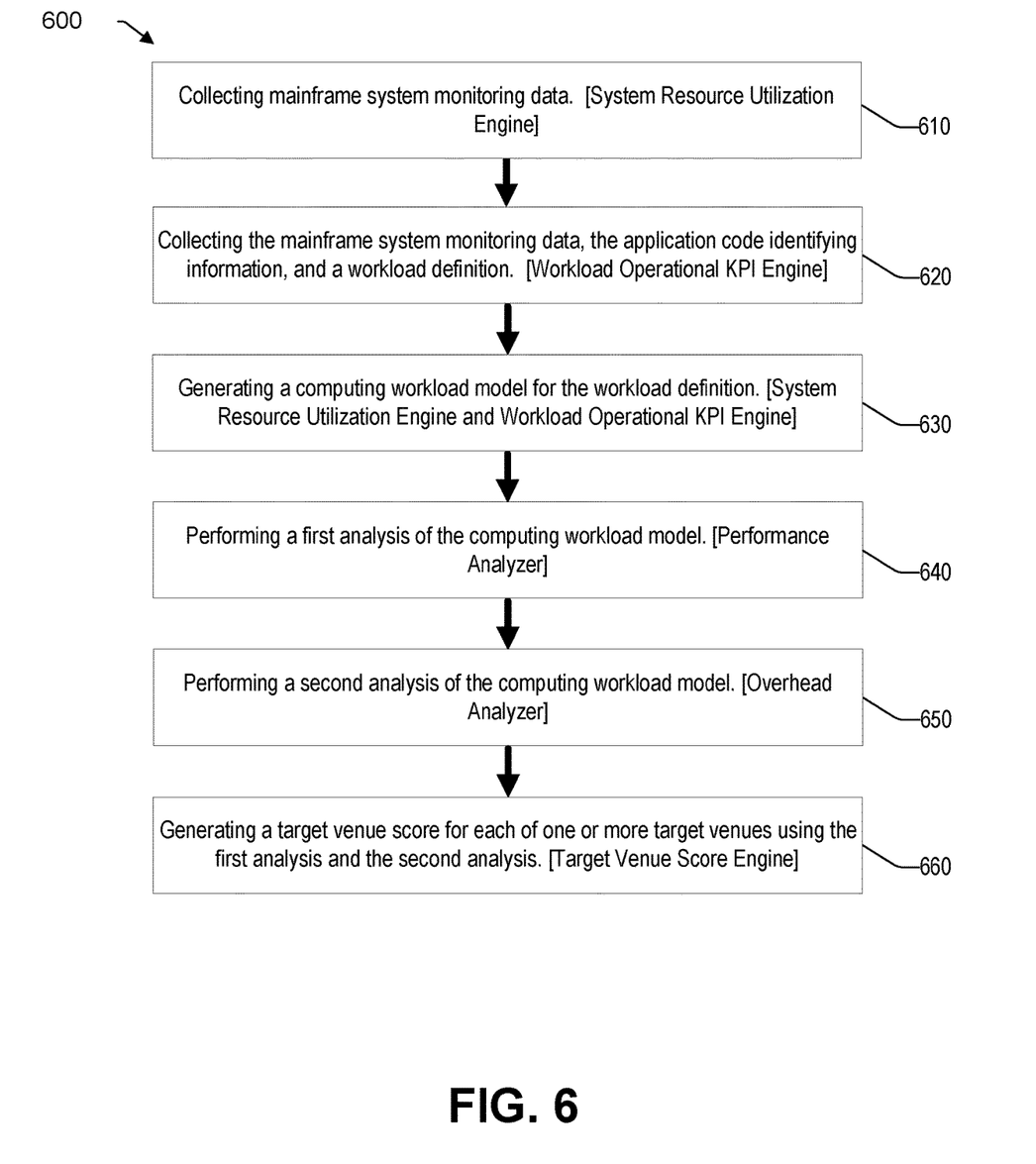
FIG. 6 is a flowchart for a method for running application code in an optimized location, consistent with an illustrative embodiment.

With the foregoing overview of the example architecture/environment/device 100, 400, it may be helpful to consider a high-level discussion of an example process. To that end FIG. 6 presents a flowchart 600 for a method for running application code in an optimized location, consistent with an illustrative embodiment.

Flowchart 600 is illustrated as a process in logical flowchart format, wherein the flowchart represents a sequence of operations that can be implemented in hardware, software, or a combination thereof. In the context of software, the process represents computer-executable instructions that, when executed by one or more processors, perform the recited operations. Generally, computer-executable instructions may include routines, programs, objects, components, data structures, and the like that perform functions or implement abstract data types. The order in which the operations are described is not intended to be construed as a limitation, and any number of the described processes can be combined in any order and/or performed in parallel to implement the process. For discussion purposes, the location optimization method is described with reference to the architecture of environment 100 and system 300 of FIGS. 1 and 3. The method is advantageous in that the optimized allocation of workloads leads to the saving of computational resources.

At block 610, a system resource utilization engine collects mainframe system monitoring data.

At block 620, a workload operational KPI engine collects the mainframe system monitoring data, application code identifying information, and a workload definition.

At block 630, the system resource utilization engine and the workload operational KPI engine generate a computing workload model for the workload definition.

At block 640, a performance analyzer performs a first analysis of the computing workload model.

At block 650, an overhead analyzer performs a second analysis of the computing workload model.

At block 660, a target venue score engine generates a target venue score for each of one or more target venues using the first analysis and the second analysis.

In an embodiment, one of the one or more target venues includes a current venue running the application code.

In a further embodiment, each of the one or more target venues is a software deployment platform such as, but not limited to: a middleware runtime, a container platform, a PaaS (platform as a service) on a private cloud, or a PaaS on a public cloud. In a further embodiment, each of the one or more target venues includes: z/OS®, z/TPF, Linux® on z/VM®, Linux® on KVM, Red Hat® Openshift® on Linux® on KVM, z/CX on z/OS®, Red Hat® Openshift® on z/OS®, Linux® on Power®, Red Hat® Openshift® on Power®, and/or Openshift® on IBM Cloud®.

In another embodiment, the location optimization method further includes transferring, based on the generation of the target venue score for each of the one or more target venues, the application code to one of the one or more target venues. The transferring is advantageous in that the transferring allows modernization of the application architecture to additional target venues and also realigns the application deployment to updated enterprise preferences of target venues based on business priorities.

In a further embodiment, the first analysis includes applying the computing workload model to one or more performance impact models and comparing the one or more applied performance impact models when the one or more applied performance impact models are applied to one or more target venue resource models.

In a further embodiment, the second analysis includes applying the computing workload model to one or more overhead impact models and comparing the one or more overhead impact models when the one or more overhead impact models are applied to one or more target venue resource models.

In a further embodiment, the target venue scores are calculated using at least one or more factors comprising: performance impact, performance hotspots, overhead impact, overhead hotspots, security posture, compliance posture, availability, or disaster recovery.

With reference to the disclosed embodiments, the methods, computing devices, and computer program products perform location optimization for running application code including the collection of system and data metrics of a workload (running an application) for creation of a computing workload model used to identify an appropriate target venue for the workload to achieve an optimized allocation of workloads, leading to the saving of computational resources.

For the purposes of this disclosure, the term "computing workload model" embodies the "as running" or "operational" characteristics/metrics of a workload.

For the purposes of this disclosure, it is understood that the specification and figures are described in reference to a single workload definition. In additional embodiments, a user may provide more than one workload definition to workload operational KPI engine 320/Ops KPI engine at block 525, where disclosed processes/methodologies can be run by computing system 300 for each of the more than one workload definitions.

Conclusion

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to call flow illustrations and/or block diagrams of a method, apparatus (systems), and computer program products according to embodiments of the present disclosure. It will be understood that each step of the flowchart illustrations and/or block diagrams, and combinations of blocks in the call flow illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the call flow process and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the call flow and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the call flow process and/or block diagram block or blocks.

The flowchart and block diagrams in the Figures illustrate the architecture, functionality, and operation of possible implementations of systems, methods, and computer program products according to various embodiments of the present disclosure. In this regard, each block in the call flow process or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or call flow illustration, and combinations of blocks in the block diagrams and/or call flow illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computer-implemented method for running application code in an optimized location using a system resource utilization engine, a workload operational key performance indicator (KPI) engine, a performance analyzer, an overhead analyzer, and a target venue score engine, the computer-implemented method comprising:
   collecting, by the system resource utilization engine, mainframe system monitoring data;
   collecting, by the workload operational KPI engine, the mainframe system monitoring data, application code identifying information, and a workload definition;
   generating, by the system resource utilization engine and the workload operational KPI engine, a computing workload model for the workload definition;
   performing, via the performance analyzer, a first analysis of the computing workload model,
      wherein the first analysis of the computing workload model includes comparing one or more performance impact models, based on applying of the one or more performance impact models to one or more target venue resource models and applying of the computing workload model to the one or more performance impact models;
   performing, via the overhead analyzer, a second analysis of the computing workload model; and
   generating, via the target venue score engine, a target venue score for each target venue of one or more target venues using the first analysis of the computing workload model and the second analysis of the computing workload model.

2. The computer-implemented method of claim 1, wherein a target venue of the one or more target venues includes a current venue running the application code.

3. The computer-implemented method of claim 1, wherein each target venue of the one or more target venues comprises: a middleware runtime, a container platform, a PaaS (platform as a service) on a private cloud, or a PaaS on a public cloud.

4. The computer-implemented method of claim 1, further comprising transferring, based on the generating of the target venue score for each target venue of the one or more target venues, the application code to a target venue of the one or more target venues.

5. The computer-implemented method of claim 1, wherein the second analysis of the computing workload model includes:
   applying the computing workload model to one or more overhead impact models, and
   comparing the one or more overhead impact models, based on applying of the one or more overhead impact models to the one or more target venue resource models and the applying of the computing workload model to the one or more overhead impact models.

6. The computer-implemented method of claim 1, wherein the generating of the target venue score is using one or more factors comprising: performance impact, performance hotspots, overhead impact, overhead hotspots, security posture, compliance posture, availability, or disaster recovery.

7. A computer program product for running application code in an optimized location, the computer program product comprising a computer readable storage medium having program instructions embodied therewith, the program instructions executable by a processor to cause the processor to perform:
   collecting, by a system resource utilization engine, mainframe system monitoring data;
   collecting, by a workload operational key performance indicator (KPI) engine, the mainframe system monitoring data, application code identifying information, and a workload definition;
   generating, by the system resource utilization engine and the workload operational KPI engine, a computing workload model for the workload definition;
   performing, via a performance analyzer, a first analysis of the computing workload model,
   wherein the first analysis of the computing workload model includes comparing one or more performance impact models, based on applying of the one or more performance impact models to one or more target venue resource models and applying of the computing workload model to the one or more performance impact models;
   performing, via an overhead analyzer, a second analysis of the computing workload model; and
   generating, via a target venue score engine, a target venue score for each target venue of one or more target venues using the first analysis of the computing workload model and the second analysis of the computing workload model.

8. The computer program product of claim 7, wherein a target venue of the one or more target venues includes a current venue running the application code.

9. The computer program product of claim 7, wherein each target venue of the one or more target venues comprises: a middleware runtime, a container platform, a PaaS (platform as a service) on a private cloud, or a PaaS on a public cloud.

10. The computer program product of claim 7, wherein the program instructions further cause the processor to perform:
transferring, based on the generating of the target venue score for each target venue of the one or more target venues, the application code to a target venue of the one or more target venues.

11. The computer program product of claim 7, wherein the second analysis of the computing workload model includes:
applying the computing workload model to one or more overhead impact models, and
comparing the one or more overhead impact models, based on applying of the one or more overhead impact models to the one or more target venue resource models and the applying of the computing workload model to the one or more overhead impact models.

12. A computing system, comprising:
a processor;
a computer-readable storage device coupled to the processor;
a system resource utilization engine coupled to the processor;
a workload operational key performance indicator (KPI) engine coupled to the processor;
a performance analyzer coupled to the processor;
an overhead analyzer coupled to the processor;
a target venue score engine coupled to the processor; and
program instructions stored on the computer-readable storage device for execution by the processor via a memory, wherein an execution of the program instructions by the processor configures the computing system to perform a method for running application code in an optimized location comprising:
collecting, by the system resource utilization engine, mainframe system monitoring data;
collecting, by the workload operational KPI engine, the mainframe system monitoring data, application code identifying information, and a workload definition;
generating, by the system resource utilization engine and the workload operational KPI engine, a computing workload model for the workload definition;
performing, via the performance analyzer, a first analysis of the computing workload model,
wherein the first analysis of the computing workload model includes comparing one or more performance impact models, based on applying of the one or more performance impact models to one or more target venue resource models and applying of the computing workload model to the one or more performance impact models;
performing, via the overhead analyzer, a second analysis of the computing workload model; and
generating, via the target venue score engine, a target venue score for each target venue of one or more target venues using the first analysis of the computing workload model and the second analysis of the computing workload model.

13. The computing system of claim 12, wherein a target venue of the one or more target venues includes a current venue running the application code.

14. The computing system of claim 12, wherein each target venue of the one or more target venues comprises: a middleware runtime, a container platform, a PaaS (platform as a service) on a private cloud, or a PaaS on a public cloud.

15. The computing system of claim 12, wherein the method further comprises transferring, based on the generating of the target venue score for each target venue of the one or more target venues, the application code to a target venue of the one or more target venues.

16. The computing system of claim 12, wherein the second analysis of the computing workload model includes:
applying the computing workload model to one or more overhead impact models, and
comparing the one or more overhead impact models, based on applying of the one or more overhead impact models to the one or more target venue resource models and the applying of the computing workload model to the one or more overhead impact models.

17. The computing system of claim 12, wherein the generating of the target venue score is using one or more factors comprising: performance impact, performance hotspots, overhead impact, overhead hotspots, security posture, compliance posture, availability, or disaster recovery.

* * * * *